(12) United States Patent
Sato (10) Patent No.: US 6,625,396 B2
(45) Date of Patent: Sep. 23, 2003

(54) CAMERA HAVING A BLUR NOTIFYING FUNCTION

(75) Inventor: Tatsuya Sato, Iruma (JP)

(73) Assignee: Olympus Optical Co., Ltd (JP)

( * ) Notice: Subject to any disclaimer, the term of this patent is extended or adjusted under 35 U.S.C. 154(b) by 0 days.

(21) Appl. No.: 10/016,021

(22) Filed: Oct. 30, 2001

(65) Prior Publication Data

US 2002/0051634 A1 May 2, 2002

(30) Foreign Application Priority Data

Nov. 2, 2000 (JP) ........................................ 2000-336163

(51) Int. Cl.⁷ ............................................... G03B 17/00
(52) U.S. Cl. ....................................................... 396/52
(58) Field of Search .................. 396/52–55; 348/208.15

(56) References Cited

U.S. PATENT DOCUMENTS

| | | | | |
|---|---|---|---|---|
| 4,673,276 A | * | 6/1987 | Yoshida et al. ................ | 396/54 |
| 4,862,277 A | * | 8/1989 | Iwaibana ................ | 348/208.15 |
| 5,402,197 A | * | 3/1995 | Okano et al. .................. | 396/55 |
| 5,576,788 A | * | 11/1996 | Miyazawa et al. ............ | 396/52 |

* cited by examiner

Primary Examiner—W. B. Perkey
(74) Attorney, Agent, or Firm—Straub & Pokotylo; John C. Pokotylo (57) ABSTRACT

In this invention, a blur of a camera is sensed by a blur sensing section. An image blur computing section calculates the amount of image blur on the photographing screen on the basis of the output of the blur sensing section. Then, an image blur level judging section compares the output of the image blur computing section with a specific value, thereby judging the blur level. According to the result of the judgment at the image blur level judging section, a blur level notifying section notifies the blur level. Furthermore, a judgment level changing section changes the specific value compared with the output of the image blur computing section.

17 Claims, 9 Drawing Sheets

| Notice of level | | Amount of image blur: [μm] |
|---|---|---|
| (Step) | (State) | |
| 1 | ●○○○○ | ~ 25 |
| 2 | ●●○○○ | 26 ~ 50 |
| 3 | ●●●○○ | 51 ~ 75 |
| 4 | ●●●●○ | 76 ~ 100 |
| 5 | ●●●●● | 101 ~ |

FIG. 10B

| Notice of level | | Amount of image blur: [μm] |
|---|---|---|
| (Step) | (State) | |
| 1 | ●○○○○ | ~ 20 |
| 2 | ●●○○○ | 21 ~ 40 |
| 3 | ●●●○○ | 41 ~ 60 |
| 4 | ●●●●○ | 61 ~ 80 |
| 5 | ●●●●● | 81 ~ |

FIG. 10C

| Notice of level | | Amount of image blur: [μm] |
|---|---|---|
| (Step) | (State) | |
| 1 | ●○○○○ | ~ 50 |
| 2 | ●●○○○ | 51 ~ 100 |
| 3 | ●●●●○ | 101 ~ 150 |
| 4 | ●●●●○ | 151 ~ 200 |
| 5 | ●●●●● | 201 ~ |

FIG. 10D

| Notice of level | | Amount of image blur: [μm] |
|---|---|---|
| (Step) | (State) | |
| 1 | ●○○○○ | ~ 20 |
| 2 | ●●○○○ | 21 ~ 40 |
| 3 | ●●●○○ | 41 ~ 60 |
| 4 | ●●●●○ | 61 ~ 150 |
| 5 | ●●●●● | 151 ~ |

CAMERA HAVING A BLUR NOTIFYING FUNCTION

CROSS-REFERENCE TO RELATED APPLICATIONS

This invention is based upon and claims the benefit of priority from the prior Japanese Patent Application No. 2000-336163, filed Nov. 2, 2000, the entire contents of which are incorporated herein by reference.

BACKGROUND OF THE INVENTION

1. Field of the Invention

This invention relates to a camera having the function of sensing the blurring state of the camera and informing the photographer of the camera blur.

2. Description of the Related Art

In recent years, various types of cameras have been developed which sense the blurring state of the camera and start the exposure operation with such timing as minimizes the blur.

Still another type of camera has been developed which calculates the amount of image blur on the basis of the output of a blur sensor built in the camera, the focal length information, and information about the exposure time, compares the result of the calculation with a specific level value, and displays the camera blur.

In the camera that displays a blur, however, the relationship between the calculated amount of blur and the displayed blur is linear (or in a one-to-one ratio). Therefore, although the displayed blur is not erroneous, the sensitivity of the display may be unsatisfactory, depending on the photographer or the photographed scene.

Specifically, some photographers do not want an indication of small blurs much but do want a clearly recognizable indication of at least large blurs. Conversely, others want subtle, small blurs to be displayed in levels minutely. Such ideas and needs are expected to increase, particularly when the number of segments in the level display increases. Since the display of blurs was unable to be set arbitrarily in the prior art, the aforementioned requirements were not satisfied.

BRIEF SUMMARY OF THE INVENTION

Accordingly, the object of the present invention is to provide a camera having a blur notifying function capable of displaying the level of blur with the sensitivity that the photographer wants.

According to a first aspect of the present invention, there is provided a camera having a blur notifying function comprising: a sensing section which senses a blur of the camera; a computing section which computes an amount of image blur on a photographing screen on the basis of an output of the sensing section; a judging section which judges a blur level by comparing an output of the computing section with a specific value; a notifying section which notifies a blur level according to the result of the judgment at the judging section; and a specific value changing section which changes the specific value compared with the output of the computing section.

According to a second aspect of the present invention, there is provided a camera having a blur notifying function comprising: a sensing section which senses a blur of the camera; a computing section which computes the amount of image blur on a photographing screen on the basis of an output of the sensing section; a judging section which judges a blur level by comparing an output of the computing section with a specific value; a notifying section which notifies a blur level according to the result of the judgment at the judging section; a setting section which sets the operation mode of the notifying operation at the notifying section; and a specific value changing section for changing the specific value serving as a judgment criterion, according to the operation mode set by the setting section.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate an embodiment of the invention, and together with the general description given above and the detailed description of the embodiment given below, serve to explain the principles of the invention.

DETAILED DESCRIPTION OF THE INVENTION

Hereinafter, referring to the accompanying drawings, an embodiment of the present invention will be explained.

Figure 1:
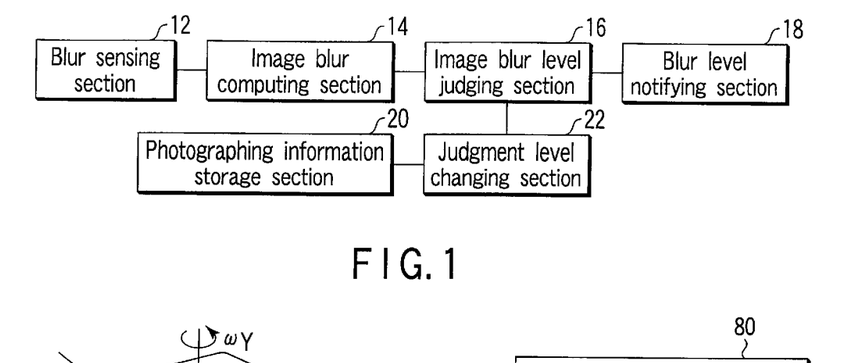
FIG. 1 is a block diagram showing the basic configuration of a camera according to an embodiment of the present invention.

FIG. 1 is a block diagram showing the basic configuration of a camera according to an embodiment of the present invention.

In FIG. 1, the camera comprises a blur sensing section 12, an image blur computing section 14, an image blur level judging section 16, a blur level notifying section 18, a photographing information storage section 20, and a judgment level changing section 22.

The blur sensing section 12 is for sensing a camera blur. The image blur computing section 14 is for computing the amount of image blur on the photographing screen on the basis of the output of the blur sensing section 12.

The image blur level judging section 16 judges the blur level by comparing the output of the image blur computing section 14 with a specific value. The level notifying section 18 notifies the blur level according to the result of the judgment at the image blur level judging section 16.

The photographing information storage section 20 is for storing the mode the photographer wants. For instance, it stores a reference value for displaying only small blurs or only large blurs. Then, the judgment level changing section 22 is for changing the reference value stored in the photographing information storage section 20 that is compared with the output of the blur computing section 14.

With this configuration, when the blur sensing section 12 has sensed a blur of the camera, the image blur computing section 14 calculates the amount of image blur on the basis of information about the blurring state, focal length, and exposure time. On the other hand, the reference value in the mode the photographer wants stored in the photographing information storage section 20 is changed at the judgment level changing section 22 as needed.

Then, the image blur level judging section 16 determines the level of a blur on the basis of the result of the calculation at the image blur computing section 14 and the reference value outputted from the judgment level changing section 22. According to the determined blur level, the blur notifying section 18 notifies the blur at the level the photographer wants.

Figure 2:
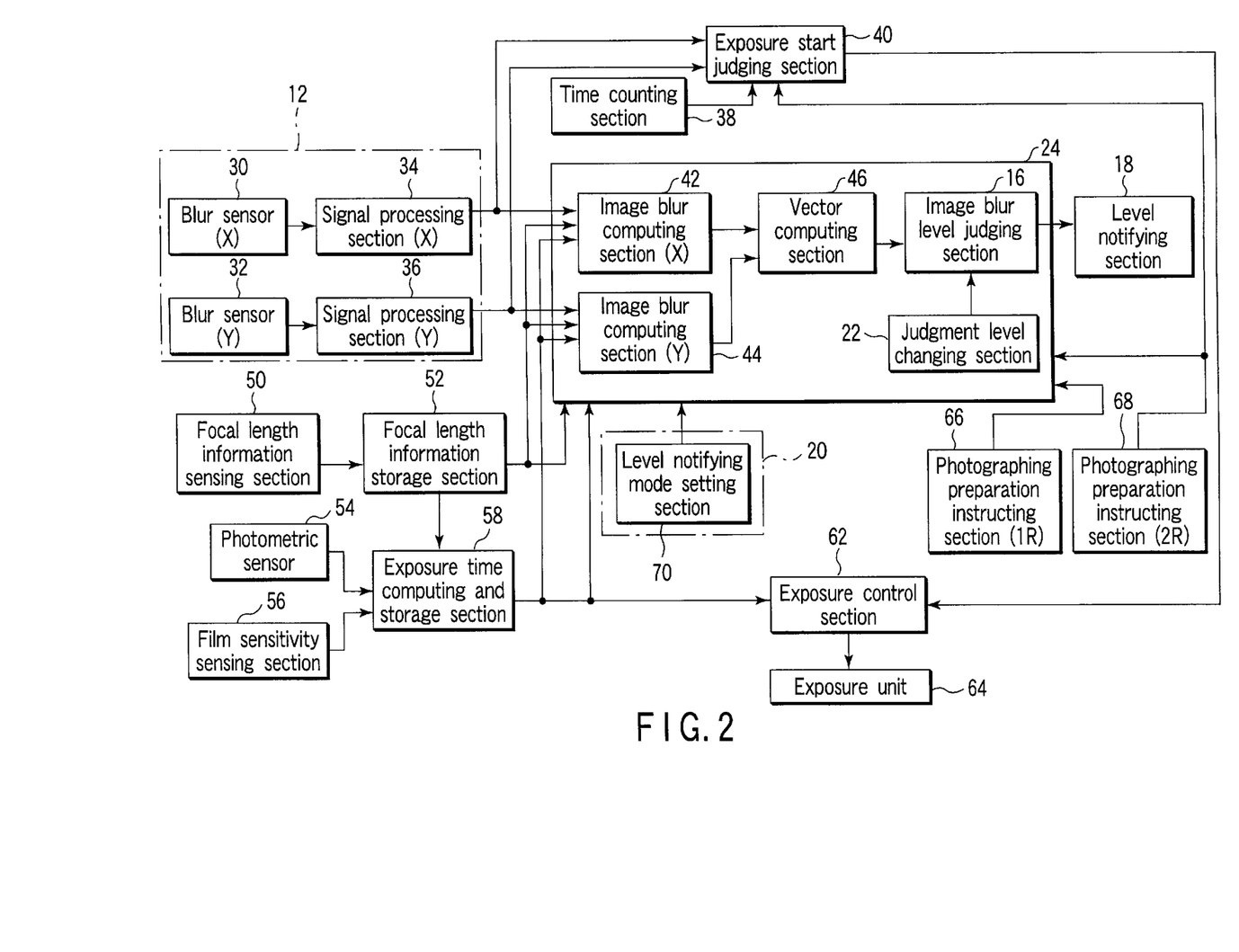
FIG. 2 is a block diagram showing a concrete configuration of a camera according to the embodiment.

FIG. 2 is a block diagram showing a concrete configuration of the camera according to the embodiment.

In FIG. 2, the blur sensing section 12 is composed of a blur sensor 30 for sensing a blur in the direction of the X-axis of the camera corresponding to the longitudinal direction of the screen, a blur sensor 32 for sensing a blur in the direction of the Y-axis of the camera corresponding to the lateral direction of the camera, a signal processing section 34 for processing the output of the blur sensor 30, and a signal processing section 36 for processing the output of the blur sensor 32.

Known angular-velocity sensors (vibration gyroscopes) are used as the blur sensors 30 and 32. Two angular-velocity sensors are used in such a manner that one is provided for the abscissa axis (X) of the photographing screen and the other for its ordinate axis (Y). The signal processing section (X) 34 and signal processing section (Y) 36 subject the signals outputted from the blur sensors 30 and 32, respectively, to amplification, sampling at an image blur level notice control section 24, and signal operations including filter operations, such as removal of noise components.

The outputs of the signal processing sections 34 and 36 are supplied to an image blur computing section (X) 42 and an image blur computing section (Y) 44, respectively, in the image blur level notice control section 24. Furthermore, the outputs of the signal processing sections 34 and 36 are supplied together with the output of a time counting section 38 to an exposure start judging section 40.

The image blur level notice control section 24 is composed of an image blur computing section (X) 42, an image blur computing section (Y) 44, a vector computing section 46, an image blur level judging section 16, and a judgment level changing section 22. The signals of the signal processing sections 34 and 36, respectively, the output of a focal length information storage section 52, and the output of an exposure time computing and storage section 58 are supplied to the image blur computing section (X) 42 and image blur computing section (Y) 44.

The focal length information storage section 52 stores information about the focal length sensed at the focal length information sensing section 50. The stored focal length information is supplied to not only the image blur level notice section 24 but also the exposure time computing and storage section 58.

Furthermore, the luminance measured at a photometric sensor 54, information about the sensitivity of the film (not shown) sensed at a film sensitivity sensing section 56, and the focal length information sensed at the focal length information sensing section 50 are supplied to the exposure time computing and storage section 58. On the basis of these pieces of information, the exposure time computing and storage section 58 computes and determines the exposure time. The output of the exposure time computing and storage section 58 is supplied to not only the image blur level notice control section 24 but also exposure control section 62.

On the basis of the output of the exposure time computing and storage section 58 and the output of the exposure start judging section 40, the exposure control section 62 controls the operation of an exposure unit 64 including a mirror and a shutter in the camera.

A level notifying section 18, a photographing preparation instructing section (1R) 66, a photographing preparation instructing section (2R) 68, and a level notifying mode setting section 70 are connected to the image blur level notice control section 24. The level notifying mode setting section 70, which constitutes the photographing information storage section 20, is for setting the level display.

The photographing preparation instructing section (1R) 66 corresponds to the first release switch of the camera and the photographing preparation instructing section (2R) 68 corresponds to the second release switch of the camera. The signal from the photographing preparation instructing section 68 is also supplied to the exposure start judging section 40.

Figure 3:
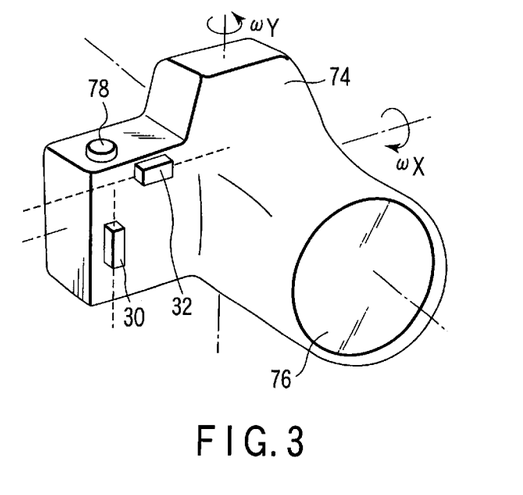
FIG. 3 is a perspective view of the camera of the embodiment, showing the layout of the blur sensors of the camera.

FIG. 3 is a perspective view of the camera of the embodiment, showing the layout of the blur sensor of the camera.

In FIG. 3, this camera, which is a single-lens reflex camera, has a photographing lens 76 at the front of the camera body 74. At the top of the camera body 74, a release button 78 corresponding to the photographing preparation instructing sections 66 and 68, is provided. Furthermore, in the camera body 74, the blur sensor 30 for sensing a blur in the direction of the X-axis of the camera and the blur sensor 32 for sensing a blur in the direction of the Y-axis of the camera are provided as shown in FIG. 3.

Figure 4:
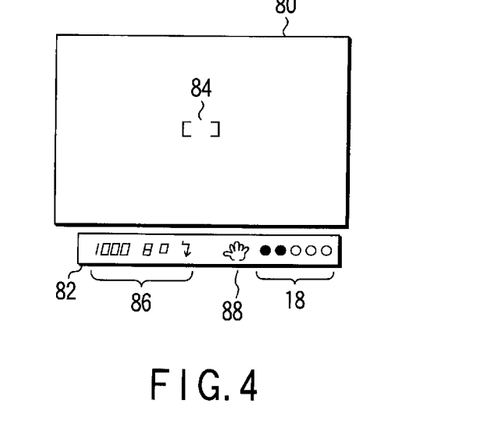
FIG. 4 shows an example of a representation in the finder of the camera according to the embodiment.

FIG. 4 shows an example of a representation in the finder of the camera.

In the finder, a finder view frame 80 and an in-finder display section 82 are displayed. In the central part of the finder view frame 80, a distance-measuring frame 84 is displayed. On the other hand, in the in-finder display section 82, a photographing information display section 86, a blur mode display section 88, and a blur level notifying section 18 are displayed.

In this case, the blur level notifying section 18 is capable of providing indications in five stages. For instance, it provides indications together with photographing information, including shutter speed and stop value, by means of LED, LCD, or the like.

FIGS. 5A to 5F show examples of the lit and unlit states of the blur level notifying section 18.

In the figures, an indication represented by a white circle denotes the unlit state and an indication represented by a black circle denotes the lit state.

Figure 5A:
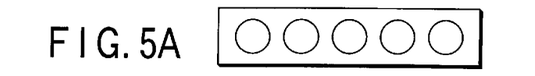
FIGS. 5A to 5F show examples of the lit and unlit state of the blur level notifying section.
Figure 5B:
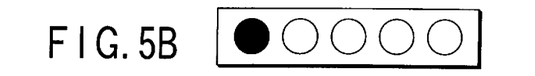
Figure 5C:
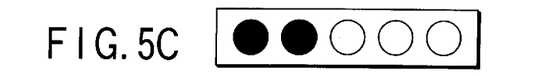
Figure 5D:
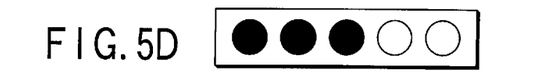
Figure 5E:
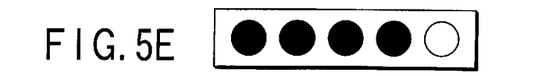
Figure 5F:
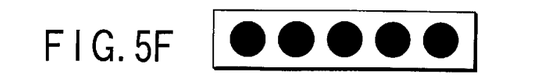

In this case, FIG. 5A shows all of the five LEDs are in the unlit state, that is, a state where there is no blur. FIG. 5B shows a state where one of the five LEDs is in the lit state. FIG. 5C shows a state where two of the five LEDs are in the lit state. FIG. 5D shows a state where three of the five LEDs are in the lit state. FIG. 5E shows a state where four of the five LEDs are in the lit state. FIG. 5F shows a state where all the five LEDS are in the lit state.

The camera blur level can be recognized from the number of lit LEDs.

Next, the operation of the camera in the embodiment will be described by reference to flowcharts shown in FIGS. 6 to 9.

Figure 6:
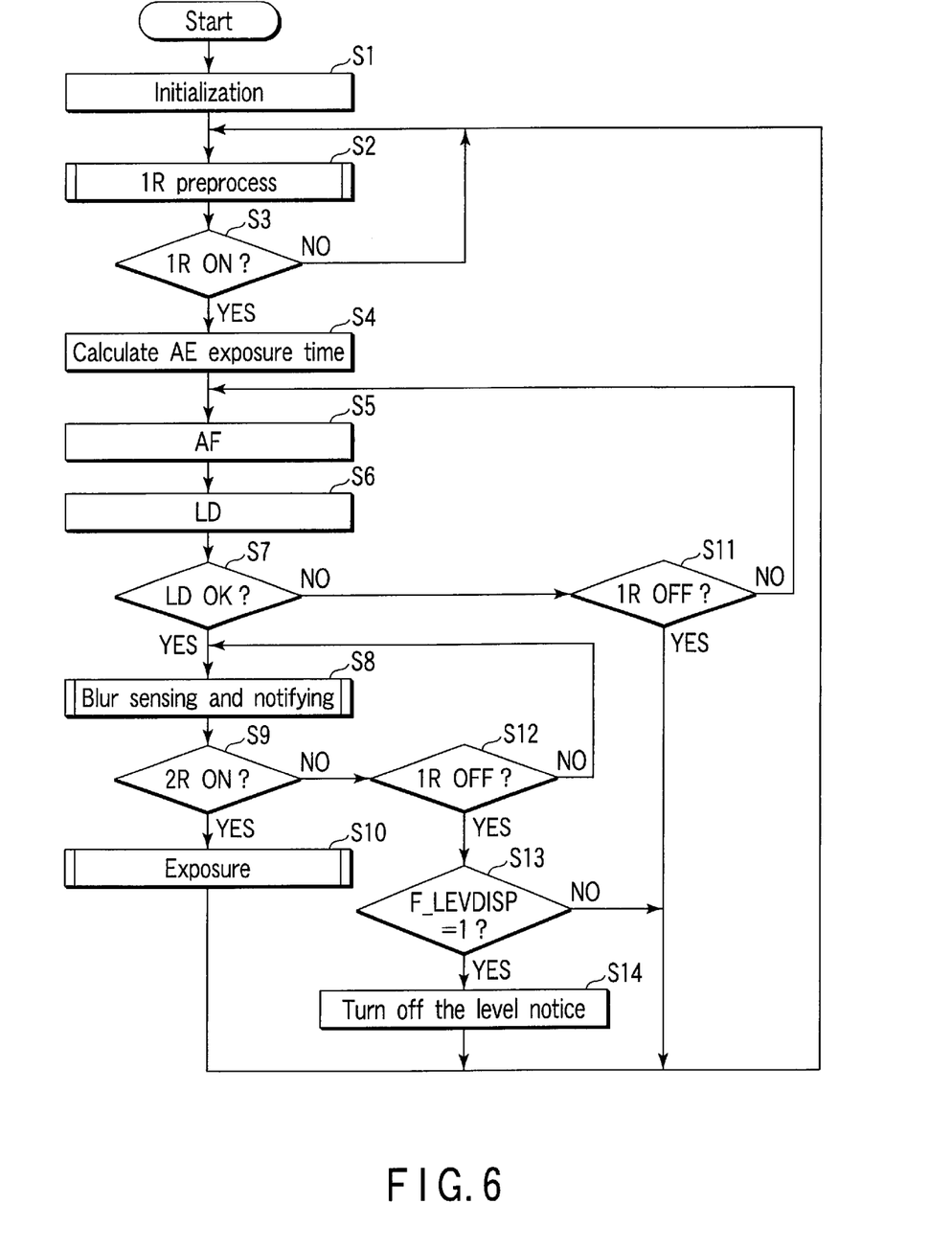
FIG. 6 is a flowchart to help explain the primary operation of the camera according to the embodiment.

FIG. 6 is a flowchart to help explain the primary operation of the camera according to the embodiment.

First, at step S1, the general setting of the camera is done. Next, at step S2, the subroutine "First release (1R) preprocess" is executed. As a result, a reference value for level judgment is set according to the setting state of the level notifying mode before the first release switch is turned on.

Figure 7A:
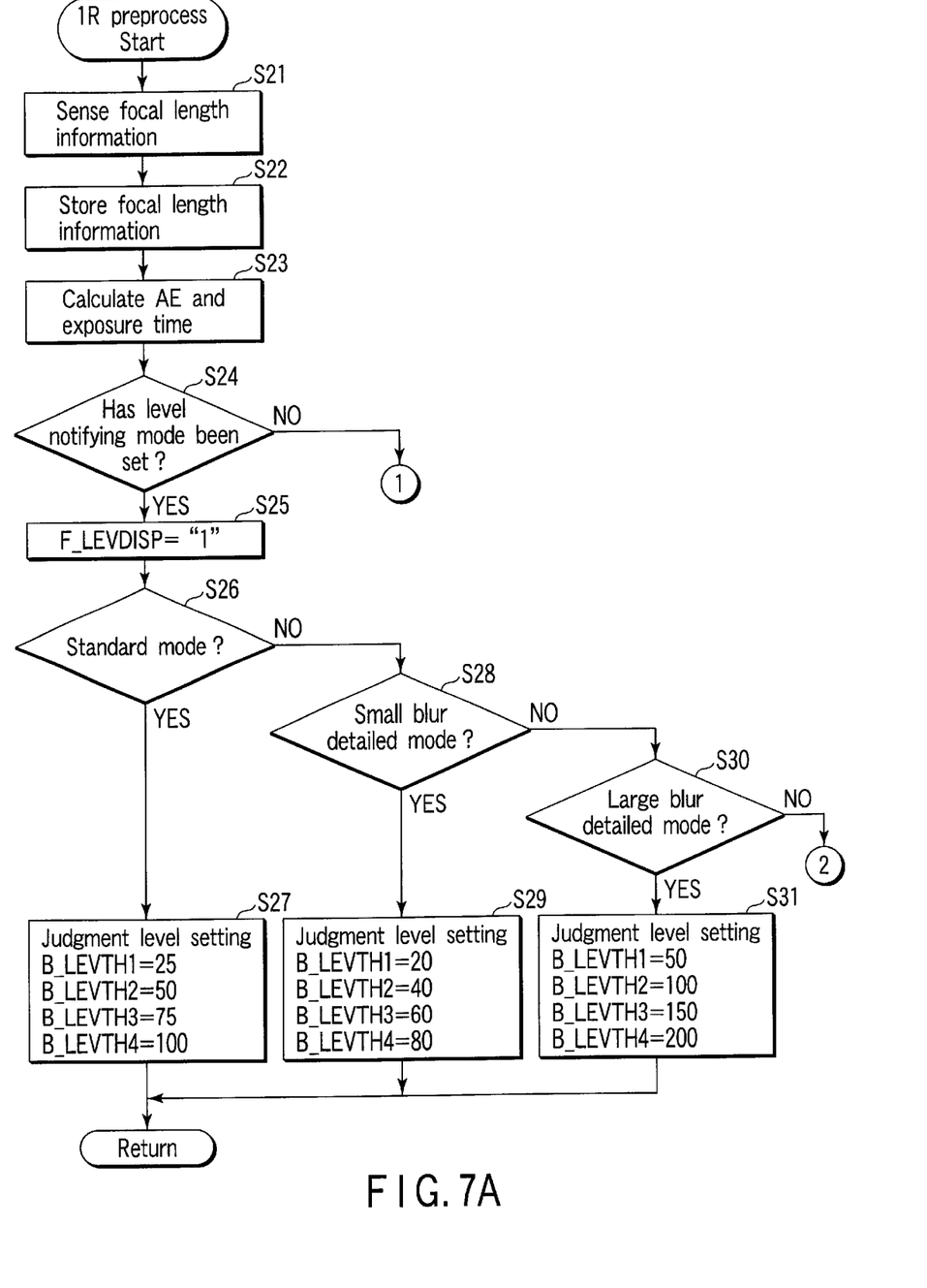
FIGS. 7A and 7B are flowcharts to help explain the operation of the subroutine "1R preprocess" at step S2 in the flowchart of FIG. 6.
Figure 7B:
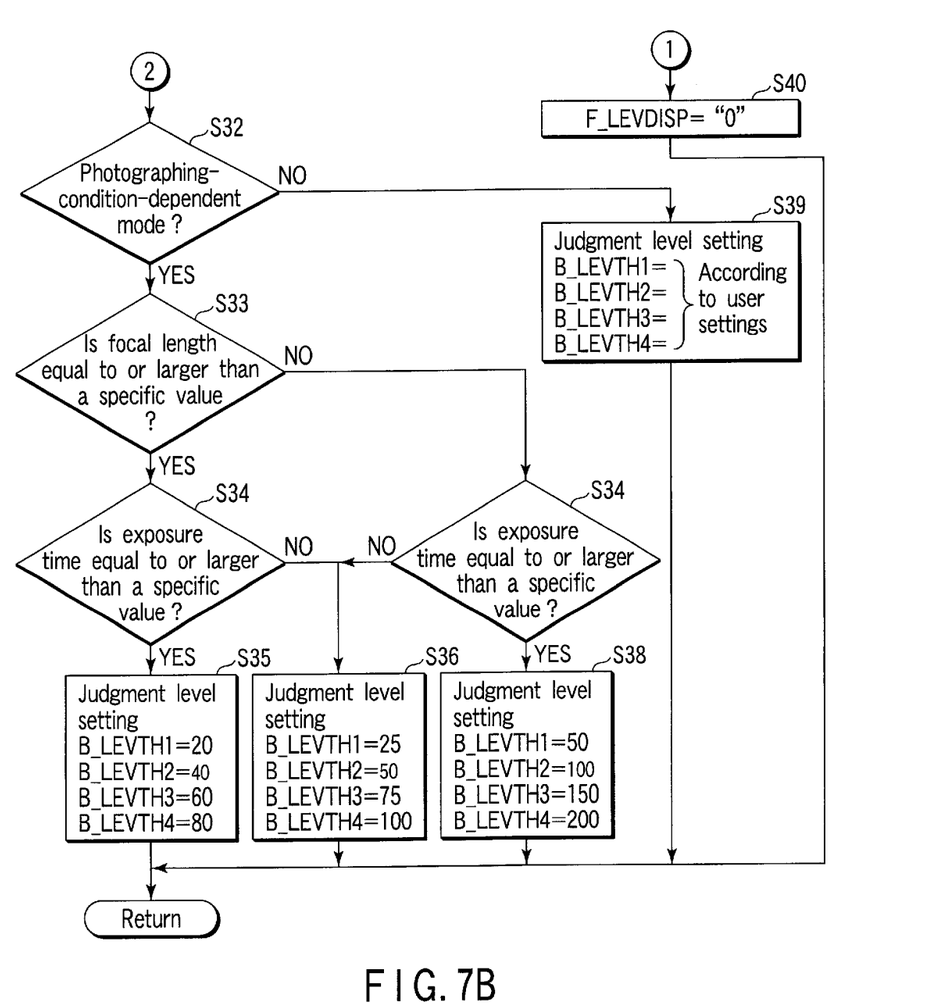

FIGS. 7A and 7B are flowcharts to help explain the operation of the subroutine "1R preprocess".

When the subroutine "1R preprocess" is started, the focal length information is first sensed at step S21 and the sensed focal length information is stored at step S22. Then, at step S23, AE (automatic exposure) and the exposure time are computed.

Then, at step S24, it is judged whether the level notifying mode has been set in the present state. If the level notifying mode has been set, control goes to step S25, where "1" is set in the level notifying mode flag F_LEVDISP. On the other hand, when the level notifying mode has not been set, control goes to step S40, where "0" is set in the level notifying mode flag F_LEVDISP.

When the level notifying mode has been set, it is then judged what level display should be made.

First, at step S26, it is judged whether the present state is the standard mode. If it is the standard mode, control goes to step S27. If it is not the standard mode, control goes to step S28.

At step S27, blur judgment levels in the standard mode are set. For example, the setting is done as follows: B_LEVTH1=25 ($\mu$m), B_LEVTH2=50 ($\mu$m), B_LEVTH3=75 ($\mu$m), and B_LEVTH4=100 ($\mu$m). Each of the values in these judgment levels indicates the amount of judgment threshold for the amount of blur.

If it is judged at step S26 that the present state is not the standard mode, control goes to step S28, where it is judged whether the present mode is the small blur detailed mode. Here, the small blur detailed mode means the mode in which a place where the amount of blur is small is reported in more detail than in the standard mode.

If the present mode is the small blur detailed mode, control goes to step S29, where blur judgment levels in the small blur detailed mode are set. For example, the setting is done as follows: B_LEVTH1=20 ($\mu$m), B_LEVTH2=40 ($\mu$m), B_LEVTH3=60 ($\mu$m), and B_LEVTH4=80 ($\mu$m). It is seen that the value of each amount of blur is smaller than that of the corresponding judgment level in the standard mode at step S27. That is, a small blur is reported in more detail than in the standard mode.

If it is judged at step S28 that the present state is not the small blur detailed mode, control goes to step S30, where it is judged whether the present state is the large blur detailed mode. Here, the large blur detailed mode means the mode in which a place where the amount of blur is large is reported in more detail than in the standard mode.

If the present mode is the large blur detailed mode, control goes to step S31, where blur judgment levels in the large blur detailed mode are set. For example, the setting is done as follows: B_LEVTH1=50 ($\mu$m), B_LEVTH2=100 ($\mu$m), B_LEVTH3=150 ($\mu$m), and B_LEVTH4=200 ($\mu$m). It is seen that the value of each amount of blur is larger than that of the corresponding judgment level in the standard mode at step S27. That is, a large blur is reported in more detail than in the standard mode.

If it is judged at step S30 that the present state is not the large blur detailed mode, control goes to step S32, where it is judged whether the present mode is the photographing-condition-dependent mode. If the present state is in the photographing-condition-dependent mode, it is judged at step S33 whether the focal length information sensed at step S21 is equal to or larger than a specific value. When the focal length information is equal to or larger than the specific value, control goes to step S34. If the focal length information is smaller than the specific value, control goes to step S37.

At step S34, the exposure time calculated at step S23 is compared with a specific value. If the exposure time is equal to or larger than the specific value, control goes to step S35. If the exposure time is smaller than the specific value, control goes to step S36.

Furthermore, at step S37, the exposure time calculated at step S23 is compared with the specific value. If the exposure time is smaller than the specific value, control goes to step S36. If the exposure time is equal to or larger than the specific value, control goes to step S38.

At steps S33, S34, and S37, a blur is liable to become larger according to the photographing condition, when the focal length is larger. The judgment level is set on the basis of the idea that a longer exposure time is liable to lead to a larger blur. Accordingly, in this case, the threshold levels are provided in a small range under conditions where blurs are liable to become larger.

Specifically, at step S35, for example, blur judgment levels are set as follows: B_LEVTH1=20 ($\mu$m), B_LEVTH2=40 ($\mu$m), B_LEVTH3=60 ($\mu$m), and B_LEVTH4=80 ($\mu$m). While in this case, the judgment levels are the same as those in the small blur detailed mode at step S29, they may be set to other values.

Furthermore, at step S36, for example, blur judgment levels are set as follows: B_LEVTH1=25 ($\mu$m), B_LEVTH2=50 ($\mu$m), B_LEVTH3=75 ($\mu$m), and B_LEVTH4=100 ($\mu$m). While in this case, the judgment levels are the same as those in the standard mode at step S27, they may be set to other values.

In addition, at step S38, for example, blur judgment levels are set as follows: B_LEVTH1=50 ($\mu$m), B_LEVTH2=100 ($\mu$m), B_LEVTH3=150 ($\mu$m), and B_LEVTH4=200 ($\mu$m). While in this case, the judgment levels are the same as those in the large blur detailed mode at step S31, they may be set to other values.

If it is judged at step S32 that the present state is not in the photographing-condition-dependent mode, the present state is considered to be in the user setting mode and control goes to step S39. The user setting mode is the mode where the user, the photographer, can do setting arbitrarily using representations on the display section or the like outside the camera body, shutter speed, stop operating member, and others.

In this user setting mode, for example, blur judgment levels are set as follows: B_LEVTH1=20 ($\mu$m), B_LEVTH2=40 ($\mu$m), B_LEVTH3=60 ($\mu$m), and B_LEVTH4=150 ($\mu$m). That is, the judgment levels need not be set linearly. In this case, when blurs are small, the setting is done as in the small blur detailed mode. When blurs exceed B_LEVTH3, the blur judgment levels are set more roughly.

At steps S27, S29, S31, S35, S36, S38, and S39, the values of the threshold levels set in the judgment level setting are just illustrative and not restrictive.

After the setting of the judgment levels have been completed, control goes to step S3 in the flowchart of FIG. 6. At step S3, the state of the first release switch is judged. If the first release switch has not been turned on, control goes to step S2. If the first release switch has been turned on, control goes to step S4.

At step S4, AE and exposure time are calculated. Furthermore, at step S5, an automatic focusing process is carried out. At step S6, according to the AF operation at step S5, the photographing lens 76 is driven to a specific position.

Next, at step S7, the position of the driven photographing lens is judged. If the position of the photographing lens is acceptable, control goes to step S8. If the position of photographing lens is unacceptable, control goes to step S11.

At step S11, the state of the first release switch is sensed again. As a result, if the first release switch is on, control goes to step S5. On the other hand, if the first release switch is off, control goes to step S2.

If the position of the lens is acceptable at step S7, the subroutine "Blur sensing and notifying" is executed at step S8.

Figure 8A:
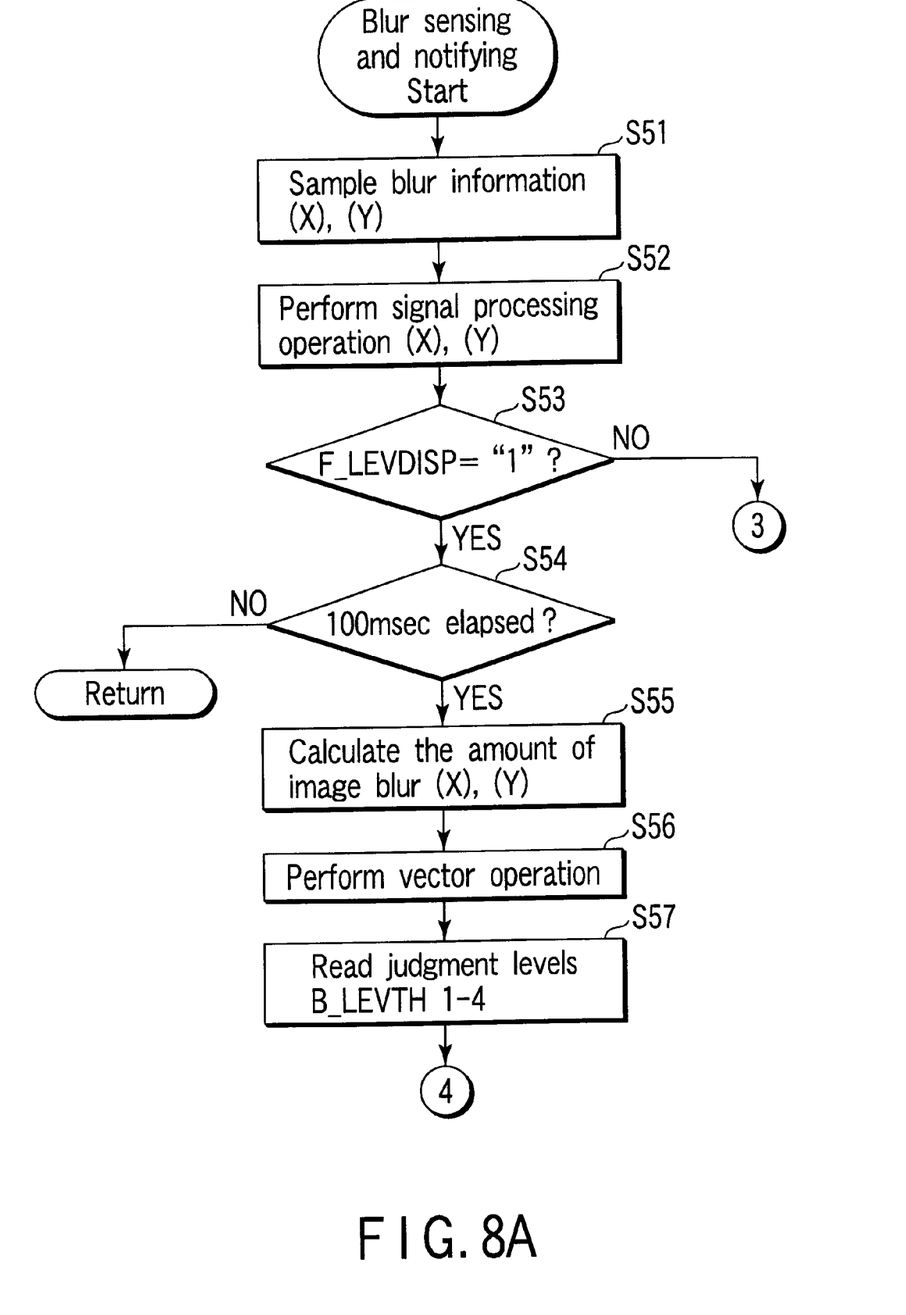
FIGS. 8A and 8B are flowcharts to help explain the operation of the subroutine "Blur sensing and notifying" at step S8 in the flowchart of FIG. 6.
Figure 8B:
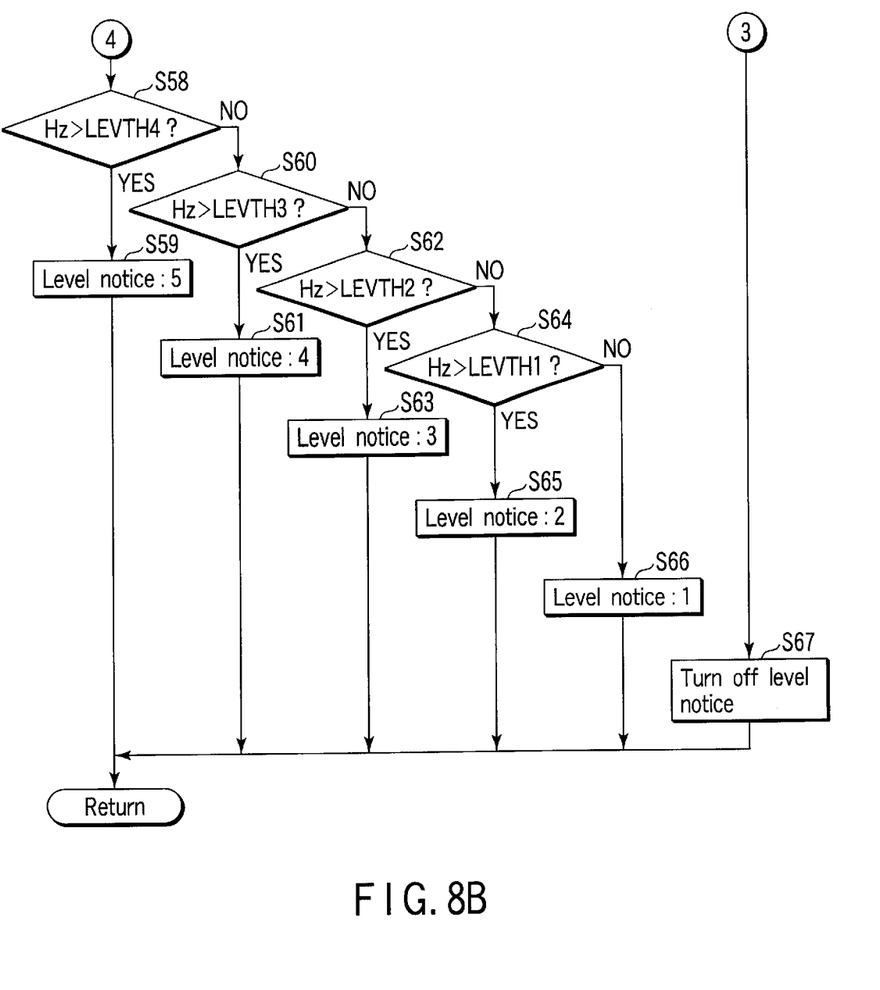

FIGS. 8A and 8B are flowcharts to help explain the operation of the subroutine "Blur sensing and notifying."

When the subroutine "Blur sensing and notifying" is started, the blur information is sampled from the blur sensors 30 and 32 at step S51. Then, at step S52, the signal processing sections 34 and 36 perform signal processing operations, thereby removing the unnecessary frequency components unrelated to blurs.

Then, at step S53, the state of a blur notifying mode flag F_LEVDISP is sensed and it is judged whether the state is in the blur level displaying mode. If the flag F_LEVDISP has a 1, it is judged that the state is in the blur level notifying mode and control goes to step S54. On the other hand, if the flag F_LEVDISP has a 0, it is judged that the state is in the blur level unnotifying mode and control goes to step S67. At step S67, the level notifying section 18 is made unlit (see FIG. 5A).

At step S54, it is judged whether 100 milliseconds have elapsed since the blur sensing and notifying subroutine was started. If 100 milliseconds have not elapsed, control exists from this routine. If 100 milliseconds have elapsed, control goes to step S55. The 100 milliseconds indicate the time when the display is updated. When subsequent processes are carried out after an elapse of 100 milliseconds, the timer or counter (not shown) is reset and this subroutine is started again, thereby starting measurements.

At step S55, the blur computing sections 42 and 44 calculate the amount of image blur ($H_X$, $H_Y$) from the blur speed information ($\omega_Y$, $\omega_X$) focal length information (f), and exposure time information (SS) using the following equations:

$$H_X = \omega_Y \cdot f \cdot SS$$

$$H_Y = \omega_X \cdot f \cdot SS$$

Then, at step S56, a vector computing section 46 performs a vector operation from the amount of image blur obtained as described above, using the following equation:

$$H_Z = (H_X^2 + H_Y^2)^{1/2}$$

Then, at step S57, the judgment levels B_LEVTH1 to B_LEVTH4 set at step S2 are read.

Next, at steps S58, S60, S62, and S64, the amount of image blur $H_Z$ is compared with the judgment levels B_LEVTH1 to B_LEVTH4.

Specifically, at step S58, the amount of image blur $H_Z$ is compared with the judgment level B_LEVTH4. As a result, if the amount of image blur $H_Z$ is larger than the judgment level B_LEVTH4, control goes to step S59. Then, at step S59, the level of blur in the state at step 5 is reported to be largest (see FIG. 5F).

If, at step S58, the amount of image blur $H_Z$ is equal to or smaller than the judgment level B_LEVTH4, control goes to step S60 and the amount of image blur $H_Z$ is compared with the judgment level B_LEVTH3. As a result, if the amount of image blur $H_Z$ is larger than the judgment level B_LEVTH3, control goes to step S61. At step S61, the level of blur in the state at step 4 is reported (see FIG. 5E).

Furthermore, if the amount of image blur $H_Z$ is equal to or smaller than the judgment level B_LEVTH3, control goes to step S62 and the amount of image blur $H_Z$ is compared with the judgment level B_LEVTH2. Then, if the amount of image blur $H_Z$ is larger than the judgment level B_LEVTH2, control goes to step S63. At step S63, the level of blur in the state at step 3 is reported (see FIG. 5D).

In addition, if the amount of image blur $H_Z$ is equal to or smaller than the judgment level B_LEVTH1, control goes to step S64 and the amount of image blur $H_Z$ is compared with the judgment level B_LEVTH1. Then, if the amount of image blur $H_Z$ is larger than the judgment level B_LEVTH1, control goes to step 565. At step S65, the level of blur in the state at step 2 is reported (see FIG. 5C).

On the other hand, if the amount of image blur $H_Z$ is equal to or smaller than the judgment level B_LEVTH1, control goes to step S66, where the level of blur in the state at step 1 is reported to be smallest (see FIG. 5B)

As described above, when the level has been reported and the subroutine "Blur sensing and notifying" has been completed, control goes to step S9 in the flowchart of FIG. 6.

At step S9, it is judged whether the second release switch has been turned on. If the second release switch is off, control goes to step S12, where the state of the first release switch is judged. If, at step S12, the first release switch is on, control goes to step S8. On the other hand, if first release switch is off, control goes to step S13.

At step S13, the blur notifying flag F_LEVDISP is judged. If the flag F_LEVDISP has a 0, control goes to step S2. If flag F_LEVDISP has a 1, control goes to step S14 and the notice by the level notifying section 4 is made unlit. Thereafter, control goes to step S2.

On the other hand, when, at step S9, the second release switch is turned on, control goes to step S10, where the routine "Exposure" is executed.

Figure 9:
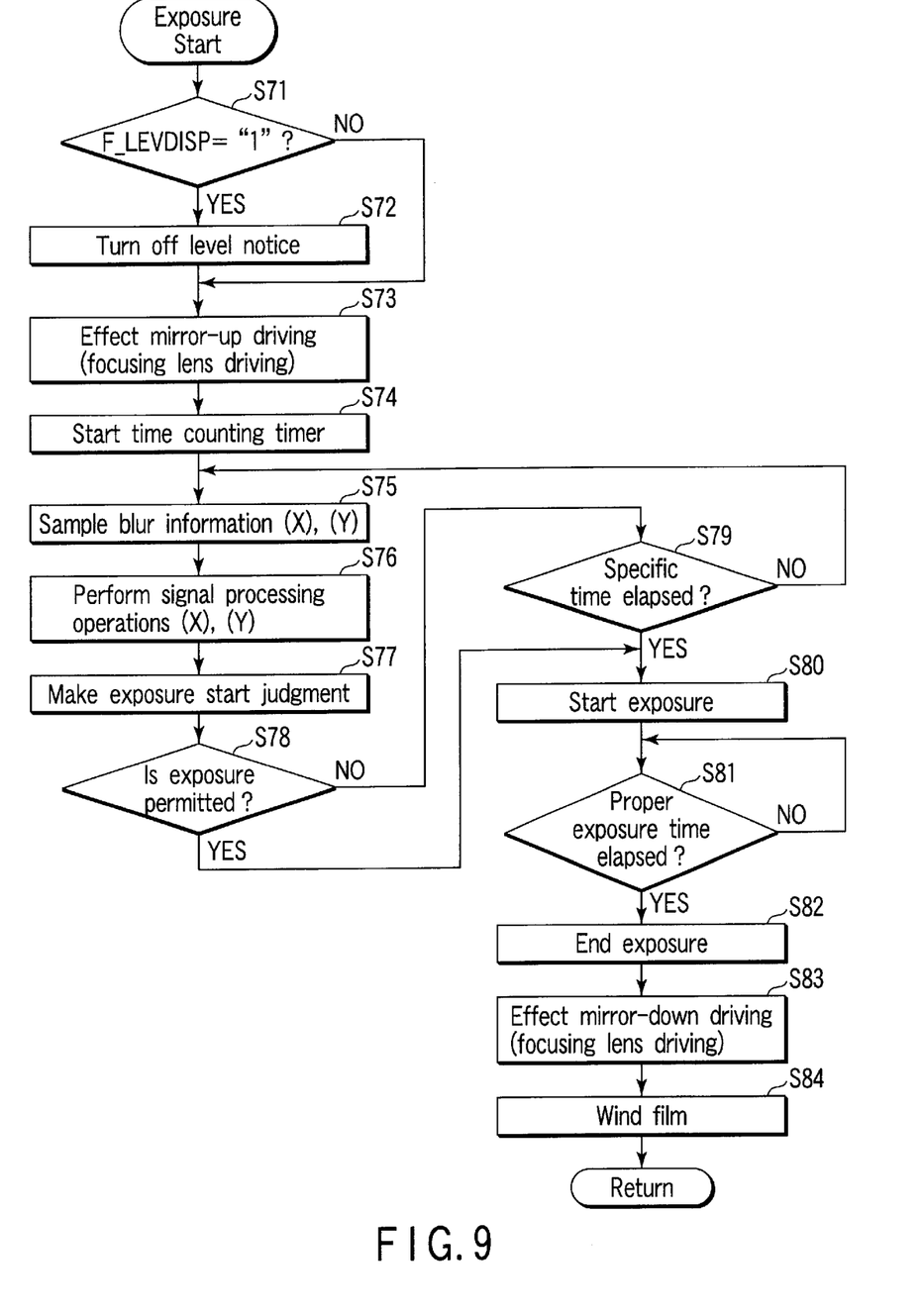
FIG. 9 is a flowchart to help explain the operation of the subroutine "Exposure" at step S10 in the flowchart of FIG. 6.

FIG. 9 is a flowchart to help explain the operation of the subroutine "Exposure."

When the subroutine "Exposure" is started, the state of the blur notifying flag F_LEVDISP is judged at step S71. If the flag F_LEVDISP has a 1, that is, when the level notifying mode is set, control goes to step S72, where the representation by the level notifying section 18 is made unlit. If the flag F_LEVDISP has a 0, the level is not reported. Therefore, control skips step S72 and goes to step S73.

At step S73, the mirror-up driving of the main mirror (not shown) is effected and at the same time, the focusing lens (not shown) is driven. Then, at step S74, the time counting timer (not shown) for starting exposure is started.

Next, at step S75, the blur information is sampled in the X-axis direction and Y-axis direction. At step S76, signal processing operations are performed. Then, at step S77, an exposure operation start judgment is made. The details of the exposure start judgment has been described in, for example, Jpn. Pat. Appln. KOKAI Publication No. 3-92830 and Jpn. Pat. Appln. KOKAI Publication No. 10-48681.

Then, at step S78, on the basis of the result of the judgment at step S77, it is judged whether the start of exposure is permitted. If the start of exposure is not permitted, it is judged that exposure should not be started and control goes to step S79. At step S79, it is judged whether the elapsed time in the time counting timer started at step 74 has exceeded a specific time.

The reason why this judgment is made is as follows. The start of exposure is not permitted unless the blur becomes small. However long the time elapses, exposure is not started unless the blur becomes small. Therefore, the user might mistake it for the malfunction of the camera. To avoid this problem, exposure is caused to start after a specific time, for example, 300 milliseconds has elapsed. This technique has been described in, for example, Jpn. Pat. Appln. KOKAI Publication No. 9-138433.

Accordingly, at step S79, if the specific time has not elapsed, control goes to step S75. If the specific time has elapsed, control goes to S80.

If the exposure start is permitted at step S78 or if the specific time has elapsed at step S79, the counting of the time counting timer is stopped and the exposure unit 64 starts to make exposure at step S80. Then, it is judged at step S81 whether a specific proper exposure time has elapsed. If the proper exposure time has elapsed, control goes to step S82, where the exposure is completed.

After the exposure has been completed in this way, the mirror-down driving of the main mirror (not shown) (in the up position at step S73) is effected at step 83. At the same time, the focusing lens (not shown) is so driven that it is returned to the initial position. Then, the film (not shown) is wound at step S84. Thereafter, after control has exited from this routine, it proceeds to step S2 in the flowchart of FIG. 6.

FIGS. 10A to 10D are tables showing the relationship between the indications of levels provided by the level notifying section 18 and the amount of image blur.

In the figures, a while circle indicates the unlit state of an LED and a black circle indicates the lit state of an LED.

Figure 10A:
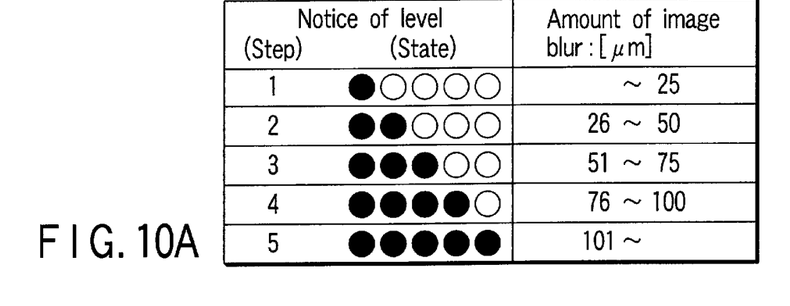
FIGS. 10A to 10D are tables showing the relationship between the level notifying indications provided by the level notifying section and the amount of image blur.

FIG. 10A corresponds to step S27 and step S36 where the standard mode is on in the flowcharts of FIGS. 7A and 7B.

Figure 10B:
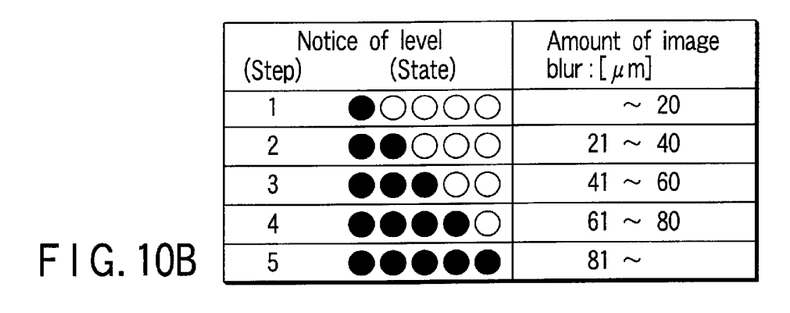

FIG. 10B corresponds to step S29 and step S35 where the small blur detailed mode is on in the flowcharts of FIGS. 7A and 7B.

Figure 10C:
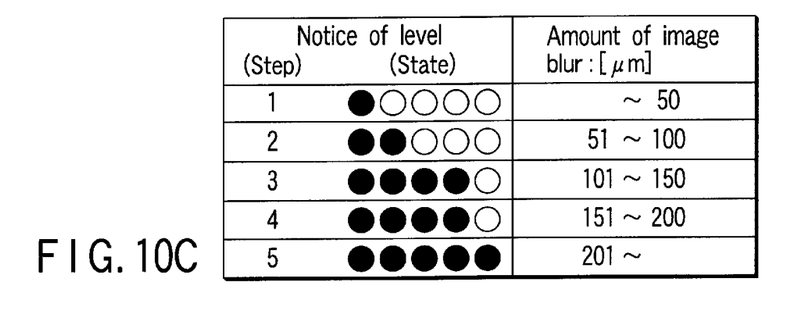

FIG. 10C corresponds to step S31 and step S38 where the large blur detailed mode is on in the flowcharts of FIGS. 7A and 7B.

Figure 10D:
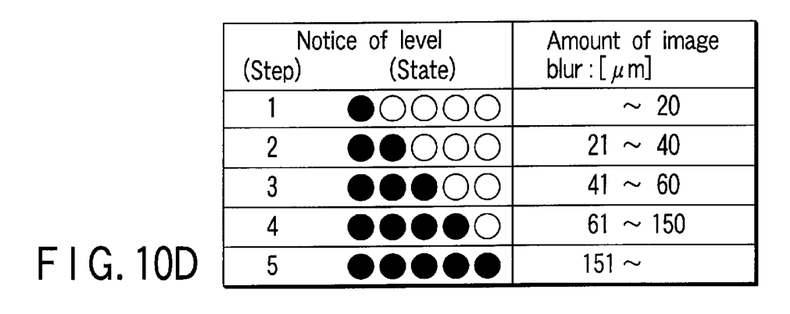

FIG. 10D corresponds to step S39 where the user setting mode is on in the flowcharts of FIGS. 7A and 7B.

While in the embodiment, level indications are given by LEDs in five stages, the present invention is not limited to this. For instance, any stepwise indication, such as 3-stage indication or 7-stage indication, may be provided.

Although an indication is provided by LEDs by changing the number of lit LEDs, only one of the LEDs may be lit, with the position of the lit LED being changed stepwise. Alternatively, the color of the lit LED may be changed, thereby providing stepwise indication.

Furthermore, a plurality of LEDs may be made different in shape, thereby providing stepwise indication.

In addition, while LEDs or the like provided in the finder have been used as the level notifying section, the present invention is not limited to this. For instance, a display section, such as LCD, may be provided outside the camera body and a level indication be provided on the display section.

Although in the embodiment, a level indication is provided in the longitudinal direction (or horizontal direction) of the finder viewing frame, it may, of course, be provided vertically.

Furthermore, while indications have been provided by lit LEDs or the like, they may be provided by blinking LEDs. In this case, stepwise indication may be provided by changing the period of blinking.

In addition, although level notice has been given by an indication of LEDs, level notice may be given in, for example, sound, provided it can give notice of level. In this case, outputs differing stepwise with each other, such as levels of sound volume, the switching between frequencies, or output patterns, may be applied.

Additional advantages and modifications will readily occur to those skilled in the art. Therefore, the invention in its broader aspects is not limited to the specific details and representative embodiment shown and described herein. Accordingly, various modifications may be made without departing from the spirit or scope of the general inventive concept as defined by the appended claims and their equivalents.

What is claimed is:

1. A camera having a blur notifying function comprising:
   a sensing section which senses a blur of the camera;
   a computing section which computes an amount of image blur on a photographing screen on the basis of an output of said sensing section;
   a judging section which judges a blur level by comparing an output of said computing section with a specific value;
   a display section which displays a blur level according to the result of the judgment at said judging section;
   a specific value changing section which changes said specific value compared with the output of said computing section; and
   a display control section which changes sensitivity of the display section with which a blur level is displayed according to changes in the specific value made by the specific value changing section.

2. The camera according to claim 1, wherein the changing of the specific value at said specific value changing section is done manually.

3. The camera according to claim 1, wherein the changing of the specific value at said specific value changing section is done according to photographing conditions of the camera.

4. The camera according to claim 3, wherein the changing of the specific value at said specific value changing section is done according to the focal length of a photographic optical system.

5. The camera according to claim 3, wherein the changing of the specific value at said specific value changing section is done according to the exposure time for an image recording medium.

6. A camera having a blur notifying function comprising:
a sensing section which senses a blur of the camera;
a computing section which computes the amount of image blur on a photographing screen on the basis of an output of said sensing section;
a judging section which judges a blur level by comparing an output of said computing section with a specific value;
a display section which displays a blur level according to the result of the judgment at said judging section;
a setting section which sets the operation mode of the display operation at said display section;
a specific value changing section for changing said specific value serving as a judgment criterion, according to the operation mode set by the setting section; and
a display control section which changes sensitivity of the display section with which a blur level is displayed, according to changes in the specific value made by the specific value changing section.

7. The camera according to claim 6, wherein said setting section is set manually.

8. The camera according to claim 6, wherein said setting section is set according to photographing conditions of the camera.

9. The camera according to claim 8, wherein said setting section is set according to the focal length of a photographic optical system.

10. The camera according to claim 8, wherein said setting section is set according to the exposure time for an image recording medium.

11. The camera according to claim 6, wherein said specific value changing section includes at least two specific values and changes the absolute values of these specific values.

12. The camera according to claim 6, wherein said specific value changing section includes at least two specific values and changes the interval between these specific values.

13. The camera according to claim 6, wherein said specific value changing section changes said specific value in each state in such a manner that the notifying operation by said notifying section gives notice of blur levels of a plurality of blurred states.

14. The camera according to claim 6, wherein the notifying operation by said notifying section is carried out by an LED display.

15. The camera according to claim 14, wherein said notifying operation is carried out by lighting LEDs.

16. A camera having a blur notifying function comprising:
a blur sensing section which senses a blur of the camera;
a blur computing section which computes an amount of image blur on a photographing screen based on an output of said blur sensing section;
a blur mode setting section for selecting one of a plurality of candidate blur modes, wherein each of the plurality of candidate blur modes has at least two blur level thresholds;
a judging section which judges a blur level by comparing an output of said blur computing section with at least one of the at least two blur level thresholds in the selected blur mode; and
a display section which displays a blur level according to the result of the judgment at said judging section.

17. The camera of claim 16 wherein the plurality of candidate blur modes includes at least two blur modes selected from a group of blur modes consisting of (A) standard mode, (B) small blur detailed mode, (C) large blur detailed mode, and (D) user specified blur mode.

* * * * *